(12) United States Patent
Akiyama et al.

(10) Patent No.: US 7,204,355 B2
(45) Date of Patent: Apr. 17, 2007

(54) SHOCK ABSORBING STRUCTURE OF TWO-WHEELED VEHICLE

(75) Inventors: Hideki Akiyama, Saitama (JP); Toyokazu Nakamura, Saitama (JP); Takeshi Yamazaki, Saitama (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/059,325

(22) Filed: Jan. 31, 2002

(65) Prior Publication Data

US 2002/0100651 A1 Aug. 1, 2002

(30) Foreign Application Priority Data

Jan. 31, 2001 (JP) ..................... 2001-023830

(51) Int. Cl.
*F16F 7/12* (2006.01)

(52) U.S. Cl. ..................... 188/371; 293/105

(58) Field of Classification Search ........... 187/371, 187/377, 379, 268; 293/105, 115
See application file for complete search history.

(56) References Cited

U.S. PATENT DOCUMENTS

| 4,165,113 A | * | 8/1979 | Casse ..................... 188/268 |
| 4,227,593 A | * | 10/1980 | Bricmont et al. ........... 188/377 |
| 4,573,724 A | * | 3/1986 | Campen .................. 188/379 |
| 4,796,719 A | * | 1/1989 | Shiratsuchi ................ 180/219 |
| 5,074,407 A | * | 12/1991 | Brumby .................... 267/140 |
| 5,620,217 A | * | 4/1997 | Ichikawa et al. ............ 293/115 |
| 5,746,419 A | * | 5/1998 | McFadden et al. ......... 188/377 |
| 6,142,253 A | * | 11/2000 | Mueller et al. ............. 180/219 |
| 6,161,857 A | * | 12/2000 | Theobald .................. 280/276 |
| 6,270,131 B1 | * | 8/2001 | Martinez et al. ............ 188/371 |

FOREIGN PATENT DOCUMENTS

| DE | 196 29 879 A1 | 1/1998 |
| DE | 197 37 599 A1 | 3/1999 |
| DE | 197 45 821 A1 | 4/1999 |
| JP | 10-67374 A | 3/1998 |

* cited by examiner

*Primary Examiner*—Melanie Torres
(74) *Attorney, Agent, or Firm*—Birch, Stewart, Kolasch and Birch, LLP (57) ABSTRACT

A shock absorbing structure of a two-wheeled vehicle capable of sufficiently absorbing shock and desirably maintain the steerability of the two-wheeled vehicle. The structure includes a shock absorbing member projecting from a front wheel, wherein the shock absorbing member is crashed when the vehicle collides with an obstacle so as to absorb shock. A ceiling wall of the shock absorbing member is located at such a position that the ceiling wall does not block a forward viewing area for a driver. A center of a leading end contact surface of the shock absorbing member is located at a position higher than a vertical position of a center of gravity G of both a motorcycle and the driver, and right and left side surfaces of the shock absorbing member are offset to a center of a vehicular body from right and left side surfaces of the motorcycle.

20 Claims, 6 Drawing Sheets

SHOCK ABSORBING STRUCTURE OF TWO-WHEELED VEHICLE

CROSS-REFERENCE TO RELATED APPLICATIONS

The present application claims priority under 35 USC 119 to Japanese Patent Application No. 2001-023830 filed on Jan. 31, 2001 the entire contents thereof is hereby incorporated by reference.

BACKGROUND OF THE INVENTION

1. Field of the Invention

The present invention relates to a shock absorbing structure for a two-wheeled vehicle including a shock absorbing member projecting from a vehicular body, wherein shock is absorbed by crashing the shock absorbing member.

2. Description of Background Art

A technique regarding a shock absorbing member for a two-wheeled vehicle has been proposed in Japanese Patent Laid-open No. Hei 10-67374 entitled "Vehicular Frame Including Riding Portion." According to this technique, a vehicle has a deformable element (hereinafter, referred to as "shock absorbing member") disposed over a front wheel, characterized in that if the vehicle collides with an obstacle, the shock absorbing member is crashed to absorb a shock.

To be more specific, according to the two-wheeled vehicle disclosed in the above document, the shock absorbing member is located at a position higher than a vertical position of a center of a gravity of the whole vehicle, whereby when the vehicle collides with an obstacle, a rear wheel can be prevented from floating upwardly. As a result, it is possible to prevent occurrence of pitching (such as the falling forward or bending backward) of the vehicle.

The above shock absorbing member can absorb a larger shock energy by enlarging a shape of the shock absorbing member, for example, by enlarging the dimensions of the member in the longitudinal direction (length direction of the vehicle), the lateral direction (width direction of the vehicle), and the height direction (vertical direction of the vehicle).

The enlargement of the shape of the shock absorbing member, however, has inconveniences. At first, if the dimensions of the shock absorbing member are enlarged in the height direction (vertical direction of the vehicle) and the longitudinal direction (length direction of the vehicle) so as to enlarge the shape of the shock absorbing member, a forward viewing area for a driver may be blocked by the shock absorbing member.

In addition, if the dimension of the shock absorbing member is enlarged in the lateral direction (width direction of the vehicle) so as to enlarge the shape of the shock absorbing member, right and left side surfaces of the shock absorbing member project outwardly from right and left side surfaces of the vehicular body, with a result that the right and left side surfaces of the shock absorbing member may interfere with an obstacle during the operation of the two-wheeled vehicle.

SUMMARY AND OBJECTS OF THE INVENTION

An object of the present invention is to provide a shock absorbing member of a two-wheeled vehicle, which is capable of sufficiently absorbing shock, desirably maintaining a forward viewing area for a driver, and preventing the shock absorbing member from interfering with an obstacle during the operation of the vehicle.

To achieve the above object, according to the present invention, there is provided a shock absorbing structure of a two-wheeled vehicle including a shock absorbing member projecting from a vehicular body, wherein shock is absorbed by crashing the shock absorbing member. A front end of the shock absorbing member is located in front of a front wheel or in the vicinity of the front wheel. An upper end of the shock absorbing member is located at such a position so that the upper end of the shock absorbing member does not block a forward viewing area for a driver. A center of a leading end contact surface of the shock absorbing member is located at a position higher than a vertical position of a center of gravity of both the vehicle and the driver. Right and left side surfaces of the shock absorbing member are offset to a center of a vehicular body from right and left side surfaces of the vehicular body.

According to the configuration of the shock absorbing structure, the front end of the shock absorbing member is located in front of a front wheel or in the vicinity of the front wheel. Accordingly, if the front end collides with an obstacle, a portion, ranging from the front end to the front wheel, of the shock absorbing member can be efficiently crashed. Such efficient crashing of the shock absorbing member allows desirable absorption of a shock.

According to the configuration of the shock absorbing member, the upper end of the shock absorbing member is located at such a position that the upper end the shock absorbing member does not block a forward viewing area for a driver. Accordingly, the forward viewing area of the driver can be desirably maintained.

According to the configuration of the shock absorbing member, the center of a leading end contact surface of the shock absorbing member is located at a position higher than a vertical position of a center of gravity of both the vehicle and the driver. Since the center of a leading end contact surface of the shock absorbing member is located at a position higher than a vertical position of a center of gravity of both the vehicle and the driver, if the front end of the shock absorbing member collides with an obstacle during the operation of the two-wheeled vehicle, a moment to press down the vehicular body acts around the front end of the shock absorbing member, to thereby prevent a rear wheel from being floated up.

According to the configuration of the shock absorbing member, right and left side surfaces of the shock absorbing member are offset to a center of a vehicular body from right and left side surfaces of the vehicular body. Accordingly, it is possible to prevent the shock absorbing member from being brought into contact with an obstacle during the operation of the two-wheeled vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the present invention will be described with reference to the accompanying drawings. It is to be noted that the drawings should be viewed in the direction of the characters.

Figure 1:
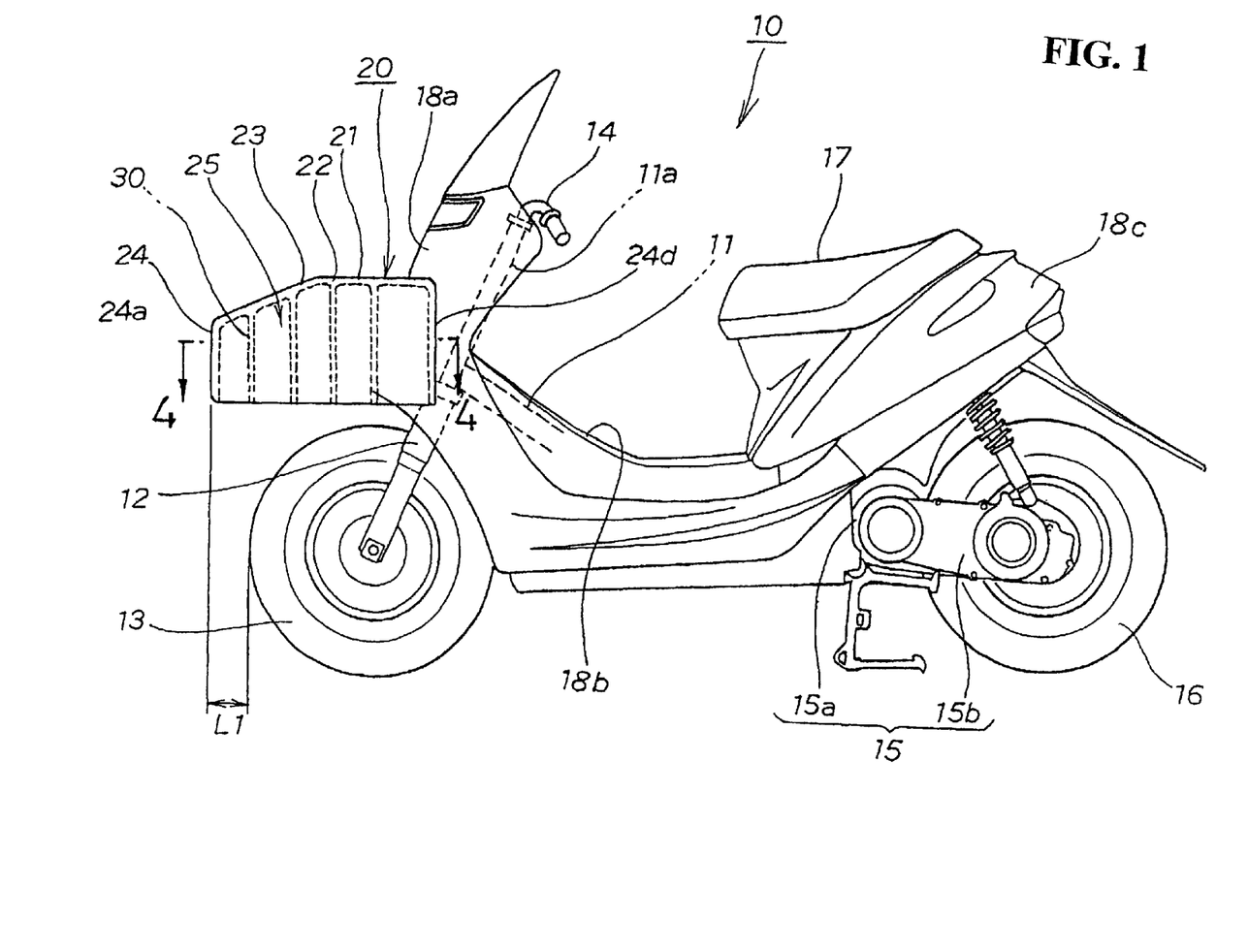
FIG. 1 is a side view of a two-wheeled vehicle including a shock absorbing structure of the present invention.

FIG. 1 is a side view of a two-wheeled vehicle including a shock absorbing structure of the present invention. In this embodiment, the two-wheeled vehicle is exemplified by a motorcycle 10.

The motorcycle 10 is a scooter-type vehicle mainly including a body frame 11, a front fork 12 mounted to a head pipe 11a of the body frame 11, a front wheel 13 mounted to the front fork 12, a handlebar 14 connected to the front fork 12 and a swing unit 15 (including an engine 15a and a transmission mechanism 15b) mounted to a rear portion of the body frame 11. A rear wheel 16 is mounted to a rear portion of the swing unit 15. A seat 17 is disposed on an upper rear portion of the body frame 11. A front cover 18a is provided for covering a front portion of the head pipe 11a. A center cover 18b extends rearwardly from the front cover 18a for covering a central portion of the body frame 11. A side cover 18c extends rearwardly from the center cover 18b for covering a rear portion of the body frame 11. A shock absorbing member 20 of the present invention provided on the front cover 18a.

The shock absorbing structure 20 is configured by mounting a frame body 22 of a shock absorbing member 21 to the front cover 18a, for example, by means of fastening means (not shown), and providing a plurality of reinforcing ribs 30 in a space 25 of the frame body 22.

The frame body 22 includes a ceiling wall 23 bent at its approximately center portion, into an approximately V-shape, and a peripheral wall 24 provided on a periphery of the ceiling wall 23. A rear end 24d of the peripheral wall 24 is mounted to the front cover 18a.

The frame body 22 can be mounted to both the front cover 18a and the body frame 11. This makes it possible to more forcibly mount the shock absorbing member 21 to the vehicular body.

The shock absorbing structure 20 is a structure made of resin, which is configured such that a front end (leading end contact surface) 24a of the shock absorbing member 21 is offset forwardly from the front wheel 13 by a distance L1, wherein if the motorcycle 10 collides with an obstacle, then shock is absorbed by crashing the shock absorbing member 21.

The distance L1 may be suitably set depending on the type of the motorcycle 10.

The shock absorbing structure 20 may be configured such that the front end 24a of the shock absorbing member 21 is located in the vicinity of the front wheel 13. In summary, the shock absorbing structure 20 may be a structure made of resin configured such that if the motorcycle 10 collides with an obstacle, then shock can be absorbed by crashing the shock absorbing member 21.

Figure 2:
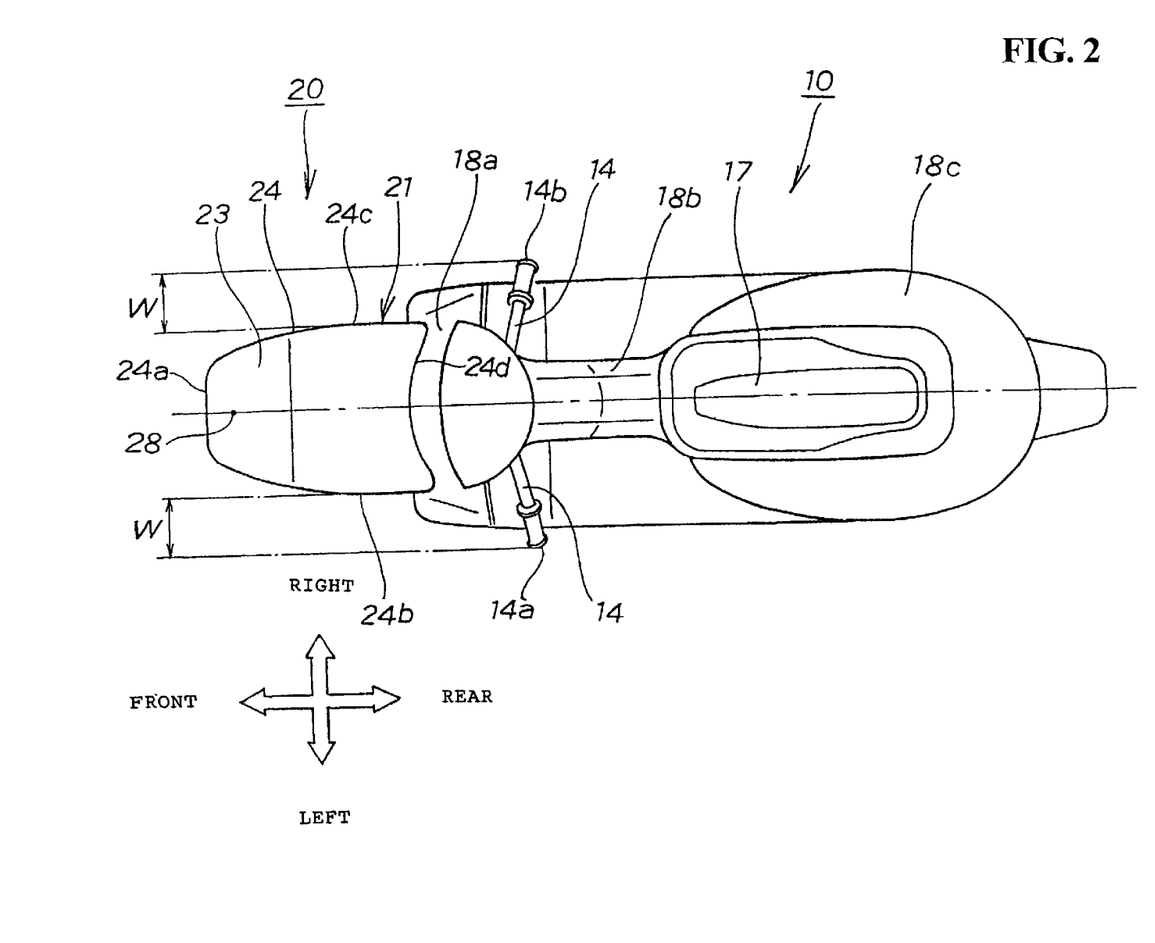
FIG. 2 is a plan view of the two-wheeled vehicle including the shock absorbing structure of the present invention.

FIG. 2 is a plan view of the two-wheeled vehicle including the shock absorbing structure of the present invention. Referring to FIG. 2, the shock absorbing member 21 is mounted to the front end of the front cover 18a, wherein right and left side surfaces 24c and 24b of the shock absorbing member 21 are each offset to a center 28 of the vehicular body from the right and left side surfaces of the vehicular body, that is, end surfaces 14b and 14a of the right and left handlebars 14 by a distance W.

It is to be noted that the peripheral wall 24 includes the front end 24a as a front wall, the right and left side walls 24c and 24b, and the rear wall 24d.

Since the right and left side surfaces 24c and 24b of the shock absorbing member 21 are offset to the center 28 of the vehicular body from the end surfaces 14b and 14a of the right and left handlebars 14, it is possible to prevent the shock absorbing member 21 from being brought into contact with an obstacle during the operation of the motorcycle 10 and hence to desirably maintain the steerability of the motorcycle 10.

In the two-wheeled vehicle shown in FIG. 2, the end surfaces 14b and 14a of the right and left handlebars 14 are taken as the right and left side surfaces of the vehicular body; however, the present invention is not limited thereto but may be applied to a two-wheeled vehicle in which other members are taken as the right and left side surfaces of the vehicular body.

Figure 3:
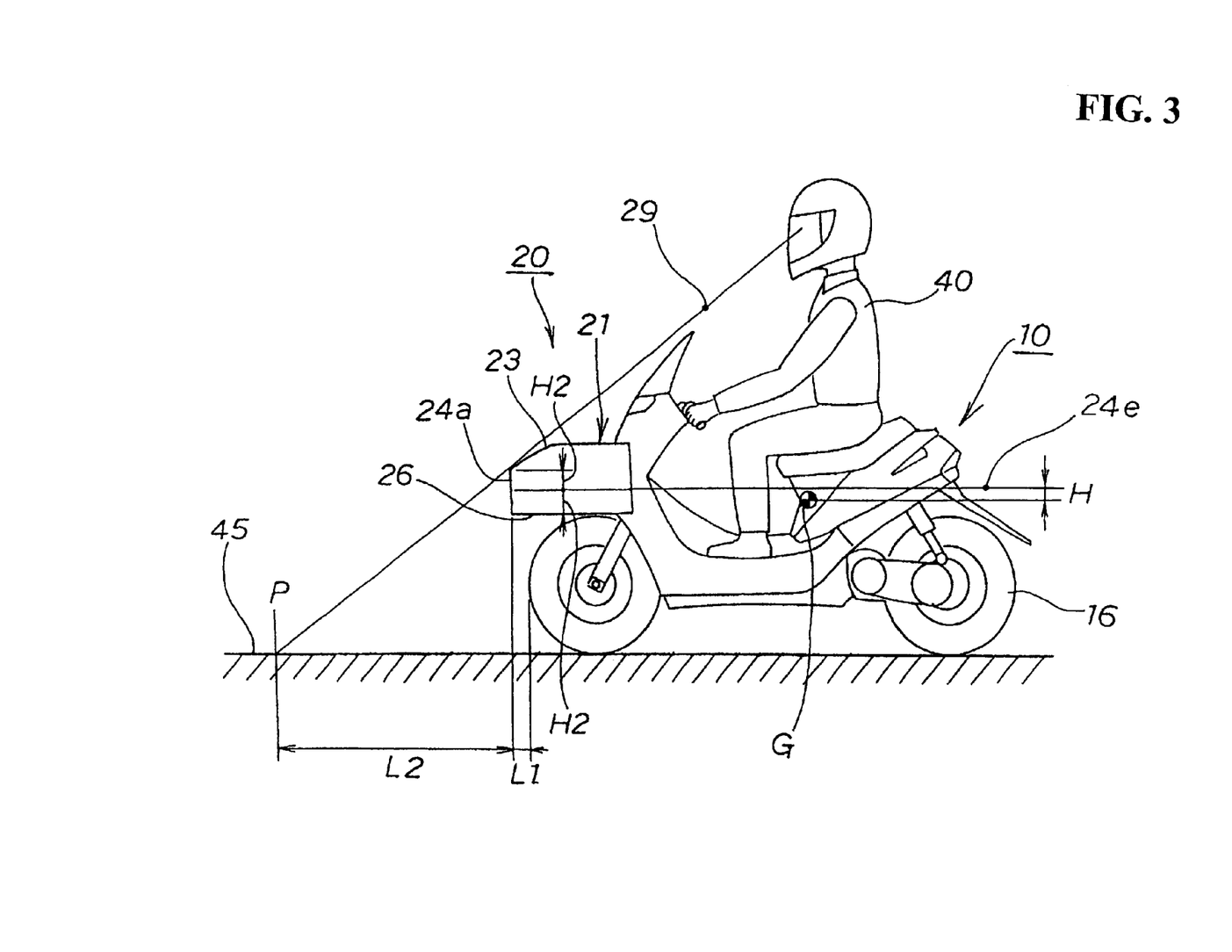
FIG. 3 is a side view of the two-wheeled vehicle including the shock absorbing structure of the present invention, showing an operational state of the vehicle.

FIG. 3 is a side view of the two-wheeled vehicle including the shock absorbing structure of the present invention, showing an operational state of the two-wheeled vehicle. Referring to FIG. 3, the upper end (ceiling wall or top wall) 23 of the shock absorbing member 21 is located at such a position that the upper end 23 does not block the forward viewing area for a driver 40, that is, located under a forward viewing area line 29 of the driver 40.

By locating the ceiling wall 23 of the shock absorbing member 21 at such a position that the ceiling wall 23 located thereat does not block the forward viewing area of the driver 40, it is possible to desirably maintain the forward viewing area of the driver 40, and hence to desirably maintain the steerability of the motorcycle 10.

The forward viewing area line 29 is defined as a line of sight along which the driver 40 looks at a position P on a road 45, the position which is separated from the front end 24a of the shock absorbing member 21 by a distance L2, over the shock absorbing member 21. The distance L2 may be suitably set depending on the type of motorcycle 10.

As shown in FIG. 3, a center 24e of the front end (leading end contact surface) 24a of the shock absorbing member 21 is located at a position higher than a vertical position of a center of gravity G of both the vehicle (motorcycle) 10 and the driver 40 by a distance H.

Letting the height of the front end (leading end contact surface) 24a be 2×H2, the center 24e is located at a height H2 from a lower end 26 of the shock absorbing member 21.

Since the center 24e of the front end 24a of the shock absorbing member 21 is set at a position higher than a vertical position of the center of gravity G of both the motorcycle 10 and the driver 40, if the front end 24a of the shock absorbing member 21 collides with an obstacle during the operation of the motorcycle 10, a moment (in the backward turn direction) to press down the vehicular body of the motorcycle 10 acts around the front end 24a of the shock absorbing member 21, to prevent the rear wheel 16 from floating upwardly, that is, to prevent the occurrence of pitching of the vehicular body.

Figure 4:
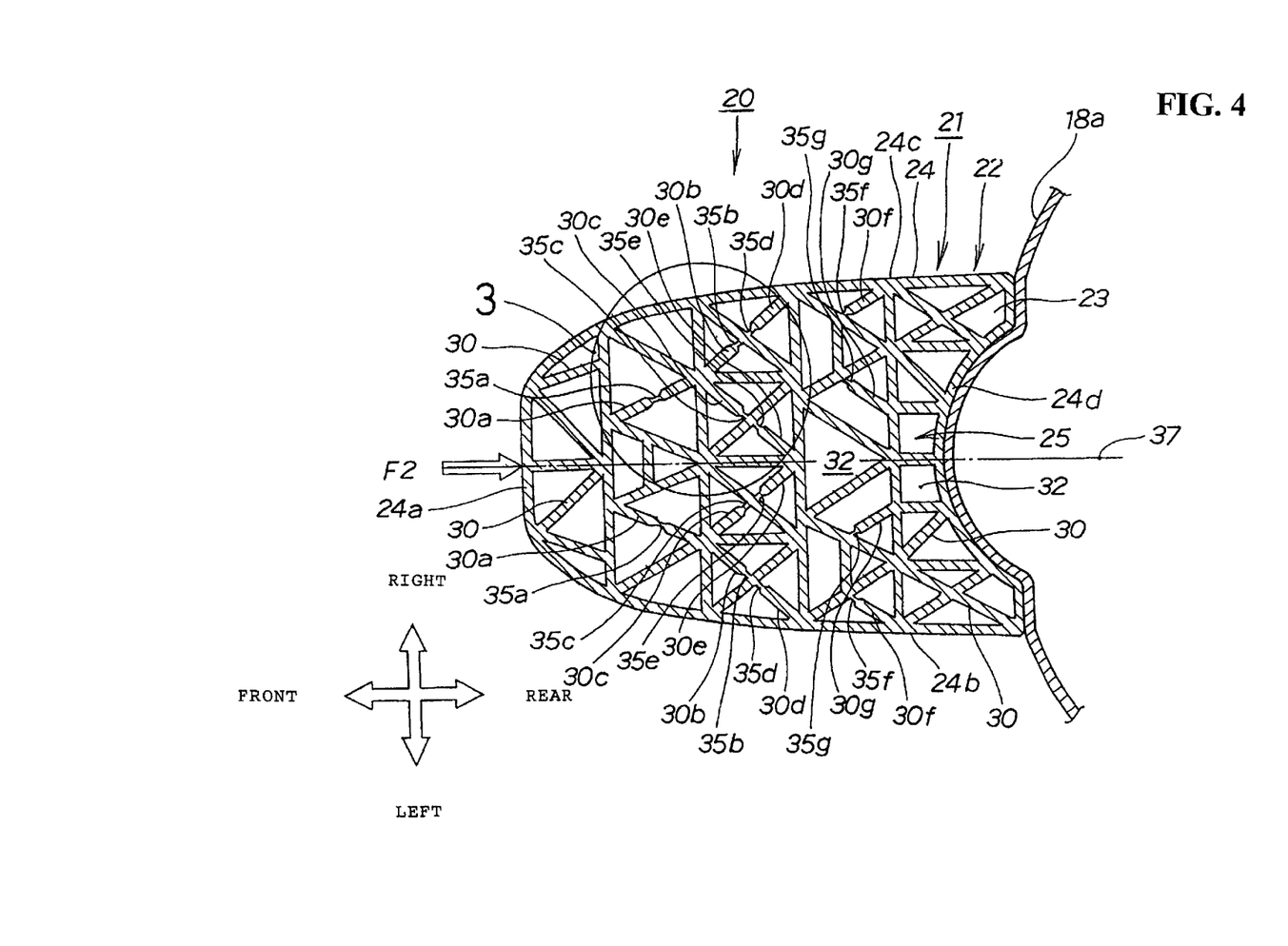
FIG. 4 is a sectional view taken on line 4—4 of FIG. 1.

FIG. 4 is a sectional view taken on line 4—4 of FIG. 1 showing one example of the shock absorbing member 21.

The peripheral wall 24 of the frame body 22 is a wall portion formed into an approximately U-shape in cross-section. The peripheral wall 24 includes the front end 24a located at a front end of the ceiling wall 23 (see FIG. 1) in such a manner as to extend in a straight line in the width direction. The left side wall 24b extends rearwardly from a left end of the front end 24a while being curved partially (specifically, at its front end). The right side wall 24c extends rearwardly from a right end of the front end 24a while being curved partially (specifically, at its front end). The rear wall 24d extends so as to connect rear ends of the right and left side walls 24c and 24b to each other while being curved into a shape following that of the front cover 18a.

With this provision of the peripheral wall 24 on the periphery of the ceiling wall 23, the space 25 can be formed in the frame body 22.

In the shock absorbing member 21, a plurality of reinforcing ribs 30 are formed in the space 25 of the frame body 22, to partition the space 25 of the frame body 22 into a plurality of cavity portions 32, wherein some of the reinforcing ribs 30, which are designated by reference numerals 30a to 30g, are partially thinned to form thin wall portions 35a to 35g, respectively.

The plurality of reinforcing ribs 30 may be arranged so as to give a specific strength to the frame body 22.

It is to be noted that the arrangement of the reinforcing ribs 30 is not limited to that shown in FIG. 2 but may be arbitrarily changed in accordance with a desired strength of the shock absorbing member 21.

Of the reinforcing ribs 30 to which a compressive force is applied, the suitable reinforcing ribs 30a to 30g are selected, and the reinforcing ribs 30a to 30g thus selected are partially thinned to form the thin wall portions 35a to 35g therefor, respectively.

To be more specific, pairs of the reinforcing ribs 30a to 30g are provided, each pair (for example, 30a and 30a) being provided on the right and left sides of the shock absorbing member 21 in such a manner as to be bilaterally symmetric with respect to an axis 37, are selected and the pairs of right and left reinforcing ribs 30a to 30g are partially thinned to form the thin wall portions 35a to 35g, respectively.

With this shock absorbing member 21, when a shock F acts on the front end 24a as shown by a white arrow, a compressive force is axially applied to the right side reinforcing ribs 30a to 30g and also to the left side reinforcing ribs 30a to 30g. As a result, the thin wall portions 35a to 35g are broken or deformed, whereby a central portion 27 of the shock absorbing member 21 is overall crashed.

Accordingly, by sufficiently crashing the shock absorbing member 21, the shock power can be positively absorbed.

In addition, since the configuration of the right side reinforcing ribs 30a to 30g is the same as that of the left side reinforcing ribs 30a to 30g, only the right side reinforcing ribs 30a to 30g will be hereinafter be described.

A function of the above-described shock absorbing structure 20 of the present invention will be described below.

Figure 5A:
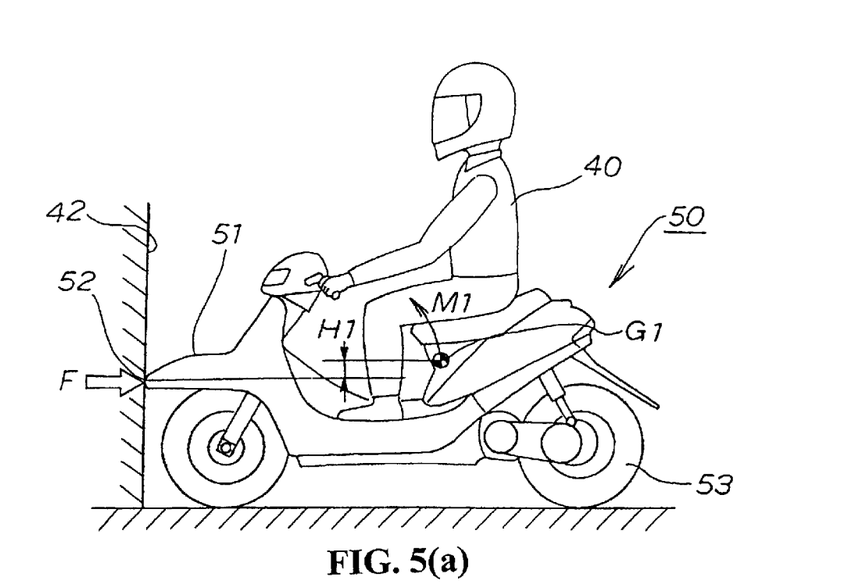
FIGS. 5(a) and 5(b) are views illustrating a function of a comparative example.
Figure 5B:
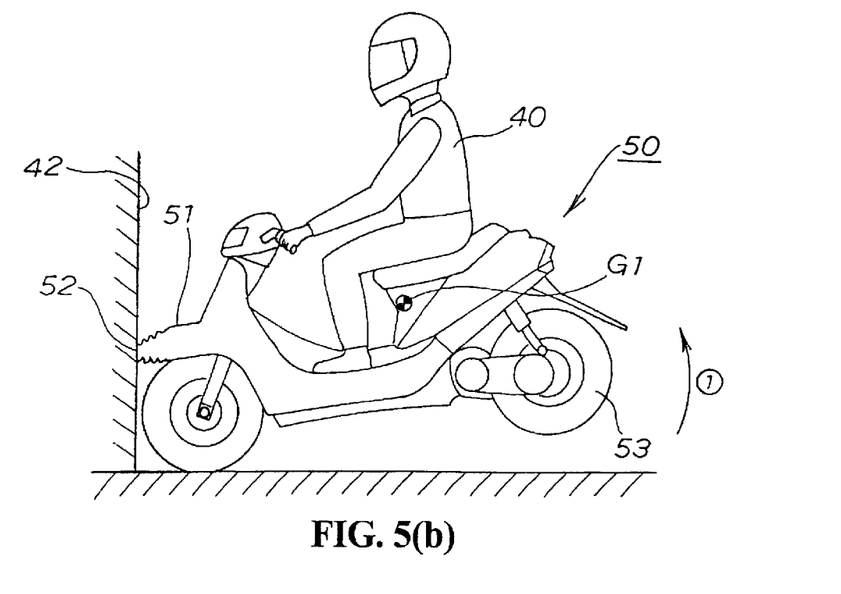

FIGS. 5(a) and 5(b) are views illustrating a function of a comparative example.

Referring to FIG. 5(a), if a front end 52 of a shock absorbing member 51 collides with an obstacle 42 during the operation of a two-wheeled vehicle 50, a shock F generated by the collision acts on a position lower than a vertical position of a center G1 of gravity of both the two-wheeled vehicle 50 and a driver 40 by a height H1.

Accordingly, at the center G1 of gravity, as shown by an arrow, there occurs a moment M1 which acts counterclockwise around the front end 52 of the shock absorbing member 51.

Referring to FIG. 5(b), a rear wheel 53 of the two-wheeled vehicle 50 floats upwardly as shown by an arrow (1), resulting in pitching of the vehicle 50.

Figure 6A:
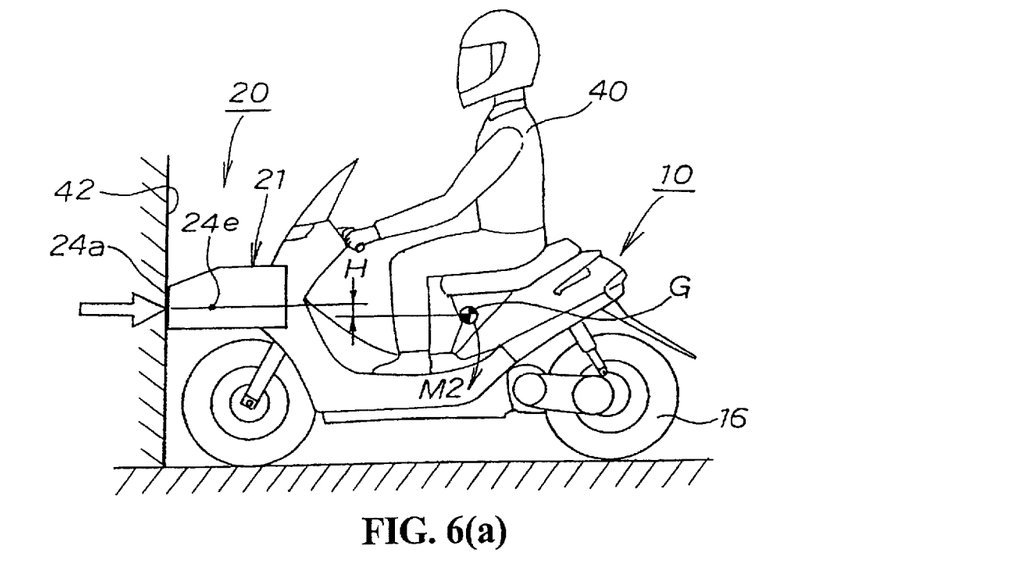
FIGS. 6(a) and 6(b) are views illustrating a function of the shock absorbing structure of the present invention.
Figure 6B:
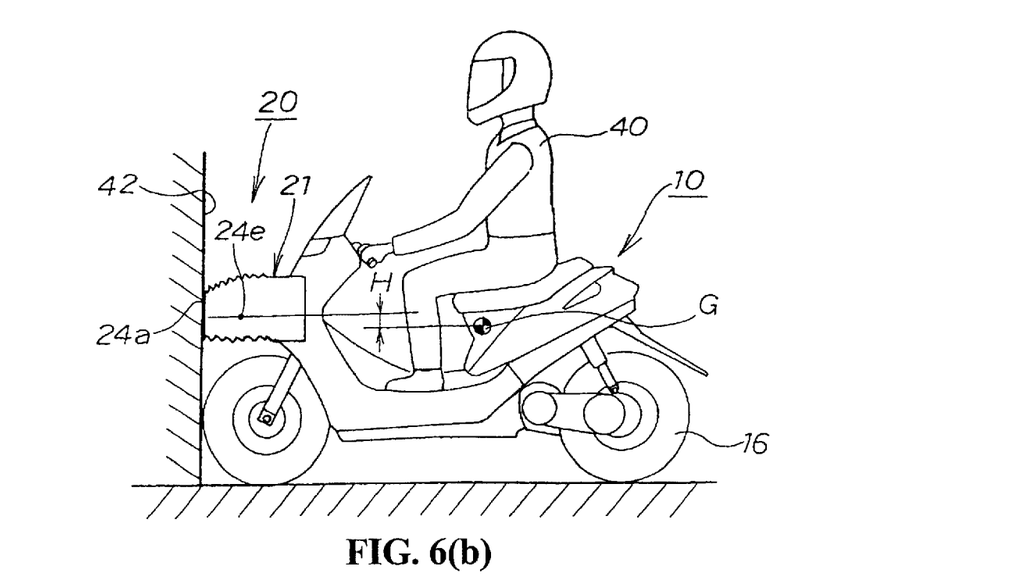

FIGS. 6(a) and 6(b) are views illustrating a function of the shock absorbing structure of the present invention.

Referring to FIG. 6(a), if the front end 24a of the shock absorbing member 21 collides with an obstacle 42 during the operation of the motorcycle 10, a shock generated by the collision acts on a position higher than a vertical position of the center of gravity G of both the motorcycle 10 and the driver 40 by a distance H.

Accordingly, at the center of gravity G, as shown by an arrow, there occurs a moment M2 which acts clockwise around the front end 24a of the shock absorbing member 21.

Referring to FIG. 6(b), it is possible to prevent the rear wheel 16 of the motorcycle 10 from floating upwardly, and hence to prevent the occurrence of pitching of the motorcycle 10.

In the embodiment, some of the reinforcing ribs 30, that is, the reinforcing ribs 30a to 30g are partially thinned to form the thin wall portions 35a to 35g therefor; however, the present invention is not limited thereto. For example, all of the reinforcing ribs 30 may be partially thinned to form the thin wall portions therefor, and further the thin wall portions 35a to 35g may be formed at arbitrary positions of the reinforcing ribs 30a to 30g.

With a suitable provision of the thin wall portions, a desired crashing form or a desired shock absorbing characteristic can be obtained.

In the embodiment, the shock absorbing member 21 is made from a resin; however, it may be made from another material such as an aluminum alloy or a steel.

In the embodiment, the shock absorbing member 21 is mounted to the front end of the vehicular body. However, the shock absorbing member 21 may be mounted to the rear end or each of the right and left side surfaces of the vehicular body. Even in this case, the same effect as that obtained by the embodiment can be obtained.

In the embodiment, the two-wheeled vehicle is exemplified by the motorcycle 10. However, it may be a scooter or a bicycle with a motor.

The present invention having the above-described configurations exhibits the following effects. According to the present invention, the front end of the shock absorbing member is located in front of a front wheel or in the vicinity of the front wheel. Accordingly, if the front end collides with an obstacle, a portion, ranging from the front end to the front wheel, of the shock absorbing member can be efficiently crashed.

Also, the upper end of the shock absorbing member is located at such a position that the upper end the shock absorbing member located thereat does not block a forward viewing area for a driver. Accordingly, it is possible to desirably keep the forward viewing area of the driver, and hence to desirably maintain the steerability of the two-wheeled vehicle.

Further, the center of a leading end contact surface of the shock absorbing member is located at a position higher than a vertical position of a center of gravity of both the vehicle and the driver. Since the center of a leading end contact surface of the shock absorbing member is located at a position higher than a vertical position of a center of gravity of both the vehicle and the driver, if the front end of the shock absorbing member collides with an obstacle during the operation of the two-wheeled vehicle, a moment to press down the vehicular body acts around the front end of the shock absorbing member, to thereby prevent a rear wheel from floating upwardly.

Additionally, right and left side surfaces of the shock absorbing member are offset to a center of a vehicular body from right and left side surfaces of the vehicular body. Accordingly, it is possible to prevent the shock absorbing member from being brought into contact with an obstacle during the operation of the two-wheeled vehicle, and hence to desirably maintain the steerability of the two-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shock absorbing structure for a two-wheeled vehicle including a shock absorbing member projecting from a vehicular body, wherein shock is absorbed by crashing said shock absorbing member, comprising:
   a front end of said shock absorbing member located in front of a front wheel or in the vicinity of said front wheel;
   a top wall of said shock absorbing member located at such a position that the top wall of said shock absorbing member does not block a forward viewing area for a driver, the top wall having a forward section with an inclined upper surface for permitting an operator to have a forward viewing area that is not obstructed;
   a center of a leading end contact surface of said shock absorbing member located at a position higher than a vertical position of a center of gravity of both said vehicle and said driver; and
   right and left side surfaces of said shock absorbing member offset to a center of a vehicular body from right and left side surfaces of said vehicular body,
   wherein said shock absorbing member is mounted on a front cover and includes a rear peripheral wall that is curved into a shape to follow that of the front cover, and
   wherein a central portion of the rear peripheral wall is concave-shaped so as to fit against a convex-shaped portion of the front cover.

2. The shock absorbing structure for a two-wheeled vehicle according to claim 1, wherein said shock absorbing member includes a plurality of reinforcing ribs having lengths extending substantially in a vertical direction with respect to the vehicular body so as to be arranged at substantially right angles to the shock to be absorbed.

3. The shock absorbing structure for a two-wheeled vehicle according to claim 2, wherein said plurality of reinforcing ribs includes ribs with partially thinned sections for facilitating the absorption of a shock.

4. The shock absorbing structure for a two-wheeled vehicle according to claim 2, wherein said plurality of reinforcing ribs are arranged to be bilaterally symmetric with respect to an axis of shock absorbing member.

5. The shock absorbing structure for a two-wheeled vehicle according to claim 2, wherein said plurality of reinforcing ribs are divided into a plurality of sections within said shocking absorbing member for sequentially absorbing a shock.

6. The shock absorbing structure for a two-wheeled vehicle according to claim 5, wherein said plurality of reinforcing ribs form substantially triangular shapes within each of said plurality of sections.

7. The shock absorbing structure for a two-wheeled vehicle according to claim 1, wherein said shocking absorbing member is formed from resin.

8. The shock absorbing structure for a two-wheeled vehicle according to claim 2, wherein said shock absorbing member is mounted on both the front cover and a body frame of the vehicular body.

9. The shock absorbing structure for a two-wheeled vehicle according to claim 1, wherein said plurality of reinforcing ribs are arranged to form spaces having cross sections that are substantially triangular shaped and trapezoidal shaped.

10. The shock absorbing structure for a two-wheeled vehicle according to claim 1, wherein said inclined upper surface of the top will causes reinforcing ribs at a forward end of the shock absorbing member to have a height that is shorter than said reinforcing ribs at a rear end of the shock absorbing body.

11. The shock absorbing structure for a two-wheeled vehicle according to claim 1, wherein said shock absorbing member includes a plurality of reinforcing ribs formed for absorbing a shock, and
   wherein at least one of the ribs formed substantially as planes extending downwardly from the top wall and extending laterally between right and left side surfaces of the shock absorbing member extends downwardly from the forward section of the top wall having the inclined upper surface.

12. A shock absorbing structure for a vehicle including a shock absorbing member projecting from a vehicular body, comprising:
   a front end of said shock absorbing member located forward of a front wheel;
   a ceiling wall of said shock absorbing member, the ceiling wall being formed with an inclined upper surface and being positioned so as not to block a forward viewing area of an operator of the vehicle;
   right and left side surfaces of said shock absorbing member being offset to a center of a vehicular body from right and left side surfaces of said vehicular body; and
   a center of a leading end contact surface of said shock absorbing member located at a vertical position higher than a position of a center of gravity of both said vehicle and said operator,
   wherein said shock absorbing member is mounted on a front cover and includes a rear peripheral wall that is curved into a shape to follow that of the front cover, and
   wherein a central portion of the rear peripheral wall is concave-shaped so as to fit against a convex-shaped portion of the front cover.

13. The shock absorbing structure for a vehicle according to claim 12, wherein said shock absorbing member is mounted on both the front cover and a body frame of the vehicular body, and wherein said shock absorbing member includes a plurality of reinforcing ribs having lengths extending substantially in a vertical direction with respect to the vehicular body so as to be arranged at substantially right angles to the shock to be absorbed.

14. The shock absorbing structure for a vehicle according to claim 13, wherein said plurality of reinforcing ribs includes ribs with partially thinned sections for facilitating the absorption of a shock.

15. The shock absorbing structure for a two-wheeled vehicle according to claim 13, wherein said plurality of reinforcing ribs are arranged to be bilaterally symmetric with respect to an axis of shock absorbing member.

16. The shock absorbing structure for a two-wheeled vehicle according to claim 13, wherein said plurality of reinforcing ribs are divided into a plurality of sections within said shocking absorbing member for sequentially absorbing a shock.

17. The shock absorbing structure for a two-wheeled vehicle according to claim 16, wherein said plurality of reinforcing ribs form substantially triangular shapes within each of said plurality of sections.

18. The shock absorbing structure for a two-wheeled vehicle according to claim 12, wherein said shocking absorbing member is formed from resin.

19. The shock absorbing struture for a two-wheeled vehicle according to claim 12, wherein said plurality of reinforcing ribs are arranged to form spaces having cross sections that are substantially triangular shaped and trapezoidal shaped.

20. A shock absorbing structure for a two-wheeled vehicle including a shock absorbing member projecting from a vehicular body, wherein shock is absorbed by crashing said shock absorbing member, comprising:

a front end of said shock absorbing member located in front of a front wheel or in the vicinity of said front wheel;

a top wall of said shock absorbing member located at such a position that the top wall of said shock absorbing member does not block a forward viewing area for a driver, the top wall having a forward section with an inclined upper surface for permitting an operator to have a forward viewing area that is not obstructed;

a center of a leading end contact surface of said shock absorbing member located at a position hiher than a vertical position of a center of gravity of both said vehicle and said driver, wherein said shock absorbing member is mounted on a front cover and includes a rear peripheral wall that is curved into a shape to follow that of the front cover, and wherein a central portion of the rear peripheral wall is concave-shaped so as to fit against a convex-shaped portion of the front cover.

* * * * *